(12) United States Patent
Chang

(10) Patent No.: US 7,728,910 B2
(45) Date of Patent: Jun. 1, 2010

(54) 2D YC SEPARATION DEVICE AND YC SEPARATION SYSTEM

(75) Inventor: Fang-Chen Chang, HsinHua (TW)

(73) Assignee: Himax Technologies, Inc., Tainan County (TW)

( * ) Notice: Subject to any disclaimer, the term of this patent is extended or adjusted under 35 U.S.C. 154(b) by 1044 days.

(21) Appl. No.: 11/438,919

(22) Filed: May 23, 2006

(65) Prior Publication Data

US 2006/0268177 A1   Nov. 30, 2006

(30) Foreign Application Priority Data

May 31, 2005 (TW) ............................. 94117758 A

(51) Int. Cl.
H04N 9/78 (2006.01)
(52) U.S. Cl. .................. 348/665; 348/667; 348/669
(58) Field of Classification Search ........... 348/663, 348/665–670; H04N 9/77, 9/78
See application file for complete search history.

(56) References Cited

U.S. PATENT DOCUMENTS 6,424,384 B1 * 7/2002 Tsyrganovich ............ 348/666
6,573,940 B1 * 6/2003 Yang ........................ 348/663
7,324,163 B2 * 1/2008 Bacche ...................... 348/663

* cited by examiner

Primary Examiner—Sherrie Hsia
(74) Attorney, Agent, or Firm—Ladas and Parry LLP

(57) ABSTRACT

The invention relates to a 2D YC separation device and YC separation system for separating a composite signal into a luma signal (Y) and a chroma signal (C). Firstly, the 2D YC separation device utilizes a low-pass filter to separate the composite signal into a low-frequency composite signal and a high-frequency composite signal. The low-frequency composite signal is a low-frequency luma signal. A 2D comb filter is utilized to separate the high-frequency composite signal into a high-frequency luma signal and the chroma signal. The luma signal is equal to the low-frequency luma signal plus the high-frequency luma signal. Therefore, the 2D YC separation device of the present invention can perfectly separate the composite signal so as to obtain a better luma signal and chroma signal. The YC separation system of the present invention further comprises a 3D YC separation device and a motion detection device, so as to obtain a precise luma signal and chroma signal.

70 Claims, 6 Drawing Sheets

2D YC SEPARATION DEVICE AND YC SEPARATION SYSTEM

BACKGROUND OF THE INVENTION

1. Field of the Invention

The present invention relates to a YC separation system, and more particularly to a 2D YC separation device and a YC separation system utilizing the 2D YC separation device.

2. Description of the Related Art

FIG. 1 is a schematic view of a conventional YC separation device. The conventional YC separation device 10 is used to separate a composite signal into a luma signal and a chroma signal. The conventional YC separation device 10 comprises a row delay circuit 11, a subtractor 12, an adder 13, a first halving circuit 14, and a second halving circuit 15.

The composite signal is a video signal, which can be an NTSC composite signal or a PAL composite signal. Taking the NTSC composite signal as an example, the composite signal can be represented as V=Y+I cos(wt)+Q sin(wt), wherein Y is a luma signal, I cos(wt)+Q sin(wt) is a chroma signal (C), and thus V=Y+C. The conventional YC separation device 10 assumed that the luma signal and the chroma signal of two horizontal scanning lines with one above the other are the same. If the composite signal is V2=Y2+C2, it will become V1=Y1+C1 after passing through the row delay circuit 11, wherein C2=−C1 due to the time difference between scanning signals, and then V1=Y2−C2. That is, the composite signal through the row delay circuit 11 is equivalent to the composite signal of a previous horizontal scanning line.

The subtractor 12 is used for subtracting the delayed composite signal V1 from the composite signal V2 (V2−V1), thus obtaining a doubled chroma signal (2×C2). Then, the doubled chroma signal (2×C2) is divided by 2 via the first halving circuit 14, thereby obtaining the chroma signal C2.

The adder 13 is used for adding the delayed composite signal V1 to the composite signal V2 (V2+V1), thus obtaining a doubled luma signal (2×Y2). Then, the doubled luma signal (2×Y2) is divided by 2 via the second halving circuit 15, thereby obtaining the chroma signal Y2.

As for the conventional YC separation device 10, it is assumed that values for the luma signal and the chroma signal of two horizontal scanning lines with one above the other are the same, that is, Y1=Y2, |C1|=|C2|, such that the luma signal and the chroma signal can be correctly separated. Therefore, if the values for the luma signal and the chroma signal of two horizontal scanning lines with one above the other are different, the luma signal and the chroma signal can't be correctly separated by utilizing the conventional YC separation device 10.

Thus, it is necessary to provide a novel and creative YC separation device to overcome the above-mentioned problems.

SUMMARY OF THE INVENTION

An objective of the present invention is to provide a 2D YC separation device for separating a composite signal into a luma signal and a chroma signal. The 2D YC separation device comprises a low-pass filter and a 2D comb filter. The low-pass filter is used to separate the composite signal into a low-frequency composite signal and a high-frequency composite signal. The low-frequency composite signal is a low-frequency luma signal. The 2D comb filter is used to separate the high-frequency composite signal into a high-frequency luma signal and the chroma signal. The luma signal is equal to the low-frequency luma signal plus the high-frequency luma signal.

Therefore, according to the 2D YC separation device of the present invention, the low-frequency composite signal is firstly obtained. The low-frequency composite signal is the low-frequency luma signal. Then the high-frequency composite signal is separated into the high-frequency luma signal and the chroma signal. Therefore, the 2D YC separation device of the present invention can perfectly separate the composite signal so as to obtain a better luma signal and chroma signal.

Another objective of the present invention is to provide a 2D comb filter for separating a composite signal into a luma signal and a chroma signal. The 2D comb filter comprises a vertical similarity detector set, a horizontal similarity detector, a vertical comb filter set, a horizontal comb filter, a comparator, an oblique similarity detector, and an oblique comb filter.

The vertical similarity detector set is used to calculate the differences between the value of a predetermined point in a predetermined row and the values of corresponding points in a plurality of adjacent rows which are adjacent to the predetermined row, thereby obtaining a plurality of vertical difference values.

The horizontal similarity detector is used to calculate the differences between the value of the predetermined point and the values of a plurality of adjacent points in the same row as the predetermined point, thereby obtaining a horizontal difference value.

The vertical comb filter set is used to calculate a plurality of vertical luma signals, based upon the value of the predetermined point in the predetermined row and the values of corresponding points in a plurality of adjacent rows, which are adjacent to the predetermined row. The horizontal comb filter is used to calculate a horizontal luma signal, based upon the value of the predetermined point and the values of a plurality of adjacent points in the same row as the predetermined point.

The comparator is used to determine a minimum difference value based upon the vertical difference values and the horizontal difference value, and thus obtain a corresponding luma signal from the vertical luma signals and the horizontal luma signal based upon the minimum difference value.

The oblique similarity detector is used to calculate the differences between the value of the predetermined point in the predetermined row and the values of adjacent points in a plurality of adjacent rows which are adjacent to the predetermined row, wherein the adjacent points are oblique with respect to the predetermined point being a centre, thereby obtaining a plurality of oblique difference values.

The oblique comb filter is used to calculate an oblique luma signal, based upon the value of the predetermined point in the predetermined row and the values of adjacent points in a plurality of adjacent rows which are adjacent to the predetermined row, and a minimum oblique difference value among the oblique difference values. Then, one of the corresponding luma signal and the oblique luma signal is selected as the luma signal.

Therefore, the 2D comb filter of the present invention utilizes a plurality of vertical similarity detectors and the horizontal similarity detector to detect the similarities in the vertical or horizontal direction of the predetermined point, and a minimum difference value is obtained. Based upon the minimum difference value, the luma signal is calculated by the corresponding comb filter, thus obtaining a better luma signal and chroma signal.

In addition, the 2D comb filter of the present invention further utilizes the oblique similarity detector to detect the similarities in a plurality of oblique directions of the predetermined point, and then an oblique luma signal is calculated by the oblique comb filter. That is, as for the 2D comb filter of the present invention adds determination of the similarities in the oblique directions, such that the YC separation can be more accurate and complete.

Still another objective of the present invention is to provide a YC separation system to separate a composite signal into a luma signal and a chroma signal. The YC separation system comprises a 2D YC separation device, a 3D YC separation device, and a motion detection device.

The 2D YC separation device is used to separate the composite signal into a 2D luma signal and a 2D chroma signal based upon data of the same frame. The 2D YC separation device comprises a low-pass filter and a 2D comb filter. The low-pass filter is used to separate the composite signal into a low-frequency composite signal and a high-frequency composite signal. The low-frequency composite signal is a low-frequency luma signal. The 2D comb filter is used to separate the high-frequency composite signal into a high-frequency luma signal and the 2D chroma signal. The 2D luma signal is equal to the low-frequency luma signal plus the high-frequency luma signal.

The 3D YC separation device is used to separate the composite signal into a 3D luma signal and a 3D chroma signal based upon data of different frames.

The motion detection device is used to detect whether the composite signals of the same predetermined point in different frames are the same, and thus determine a 2D parameter and a 3D parameter. The 2D parameter, 3D parameter, the 2D luma signal, the 2D chroma signal, the 3D luma signal, and the 3D chroma signal are used to calculate the luma signal and the chroma signal.

Therefore, according to the present invention, the YC separation system utilizes the 3D YC separation device, the motion detection device and the 2D YC separation device. That is, the determination and calculation of the composite data in different frames are also added so as to obtain the precise luma signal and chroma signal.

DETAILED DESCRIPTION

Figure 2:
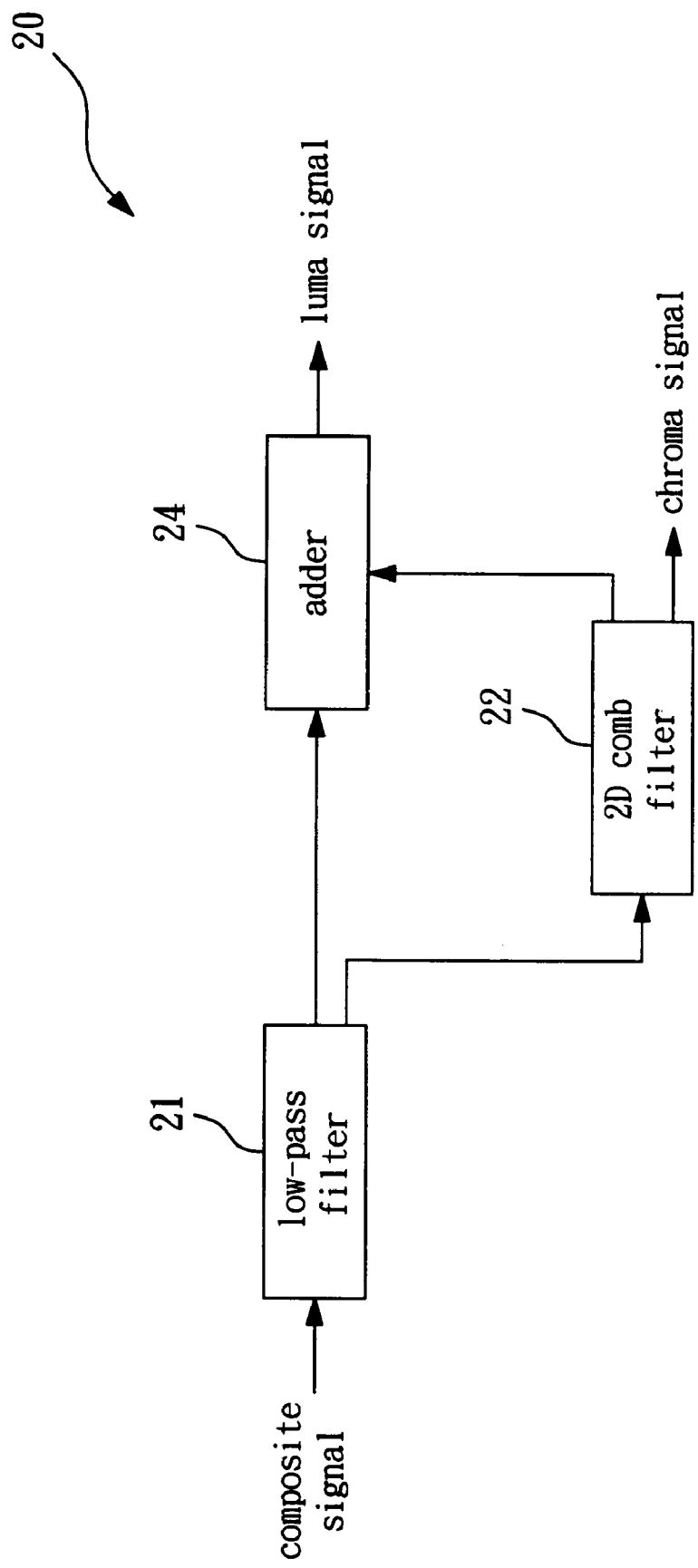
FIG. 2 is a schematic view of a 2D YC separation device according to the present invention.

FIG. 2 is a schematic view of a 2D YC separation device according to the present invention. The 2D YC separation device 20 of the present invention is used to separate a composite signal into a luma signal and a chroma signal. The 2D YC separation device 20 comprises a low-pass filter 21, a 2D comb filter 22, and an adder 24. The low-pass filter 21 is used to separate the composite signal into a low-frequency composite signal and a high-frequency composite signal.

There is no chroma signal (but only luma signal) at low frequencies (less than about 2 MHz), so the low-frequency composite signal is a low-frequency luma signal. The low-pass filter 21 calculates the low-frequency luma signal by combining a predetermined point and a plurality of adjacent points in the same row as the predetermined point based upon a weighting set.

Figure 4:
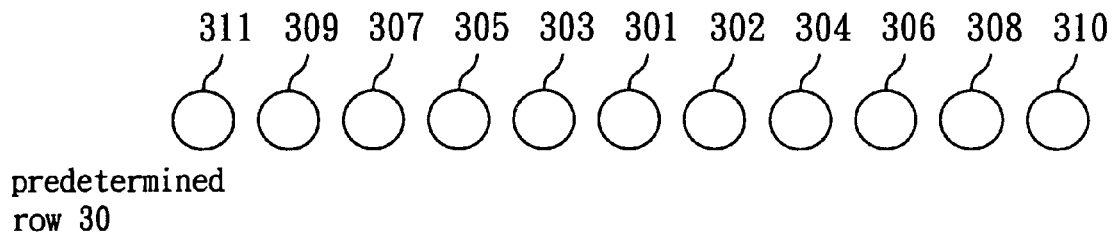
FIG. 4 is a schematic view of adjacent points in the same row as a predetermined row of a predetermined point.

Referring to FIG. 4, the predetermined point 301 is set in a predetermined row 30, and the plurality of adjacent points 302, 303, 304, 305, 306, 307, 308, 309, 310, 311 are in the same row as the predetermined point. As to the predetermined point 301 and the adjacent points 302, 303, 304, 305, 306, 307, 308, 309, the corresponding weighting set is 24, 0, 0, 16, 16, 0, 0, 4, 4. The weighting set is multiplied by the value $H_{301}$ of the predetermined point and the values $H_{302}$, $H_{303}$, $H_{304}$, $H_{305}$, $H_{306}$, $H_{307}$, $H_{308}$, $H_{309}$ of the adjacent points correspondingly, all the products are added up together, and then the result is divided by the sum of the weighting set (64=24+16+16+4+4), and thereby the low frequency luma signal is calculated. Thus, the low-frequency luma signal YL can be represented as:

$$YL = (24 \times H_{301} + 0 \times H_{302} + 0 \times H_{303} + 16 \times H_{304} + 16 \times H_{305} + 0 \times H_{306} + 0 \times H_{307} + 4 \times H_{308} + 4 \times H_{309})/(64 = 24 + 16 + 16 + 4 + 4).$$

The low-pass filter 21 described above is only for illustration, and not limited to the embodiment and the weighting set.

Figure 1:
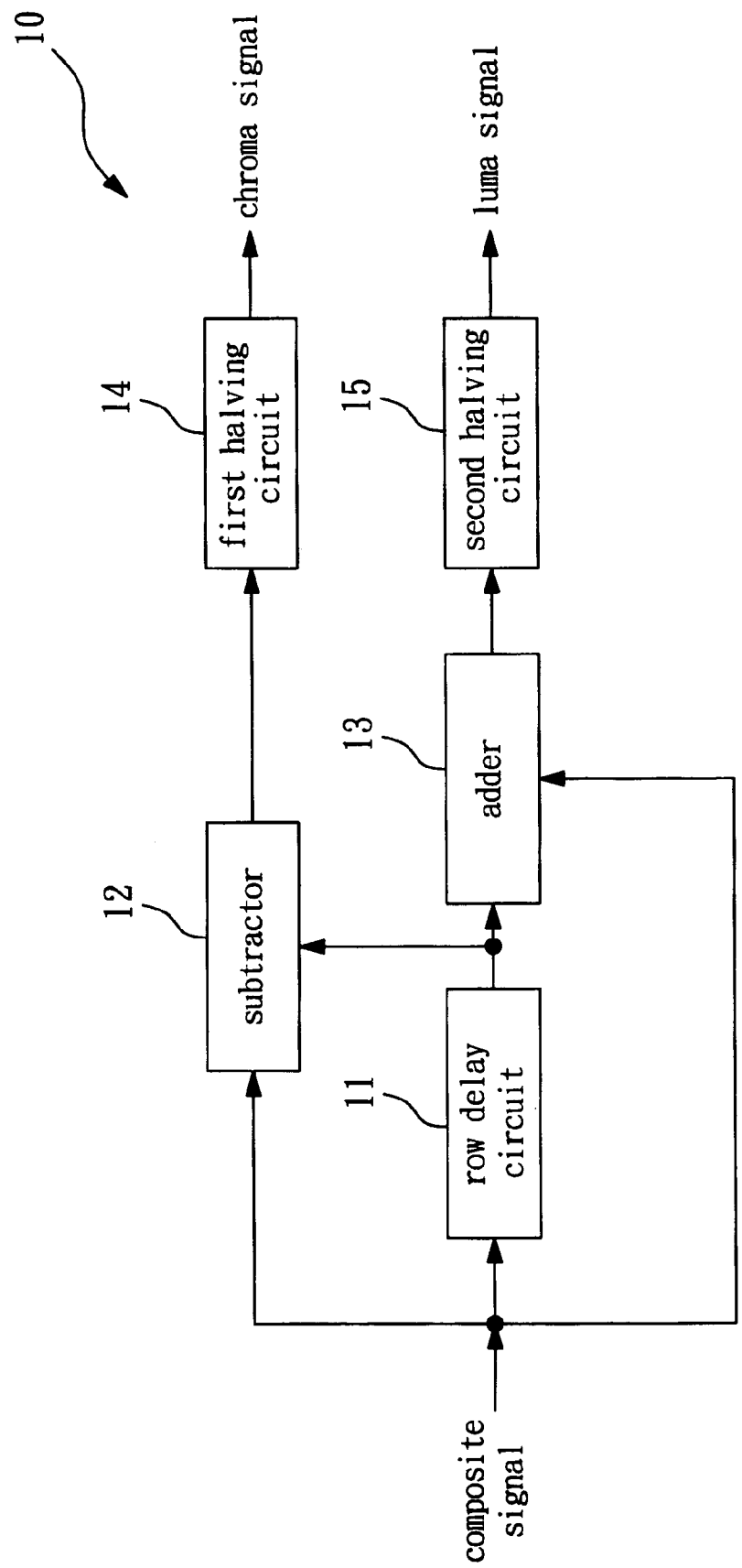
FIG. 1 is a schematic view of a conventional YC separation device.

The high-frequency composite signal is inputted into the 2D comb filter 22. The 2D comb filter 22 is used to separate the high-frequency composite signal into a high-frequency luma signal and the chroma signal. The adder 24 is used for adding the low-frequency luma signal and the high-frequency luma signal to obtain the luma signal. The 2D comb filter 22 can be any 2D comb filter (for example, the YC separation device 10 as shown in FIG. 1) or the 2D comb filter 22 as shown in FIG. 6.

Therefore, the 2D YC separation device 20 of the present invention firstly utilizes the low-pass filter 21 to separate the composite signal into the low-frequency composite signal and the high-frequency composite signal. The low-frequency composite signal is the low-frequency luma signal. Then the 2D comb filter 22 is utilized to separate the high-frequency composite signal into the high-frequency luma signal and the chroma signal. Finally, the luma signal is obtained by adding the low-frequency luma signal and the high-frequency luma signal. Thus, the 2D YC separation device 20 of the present invention can perfectly separate the composite signal so as to obtain a better luma signal and chroma signal.

Figure 6:
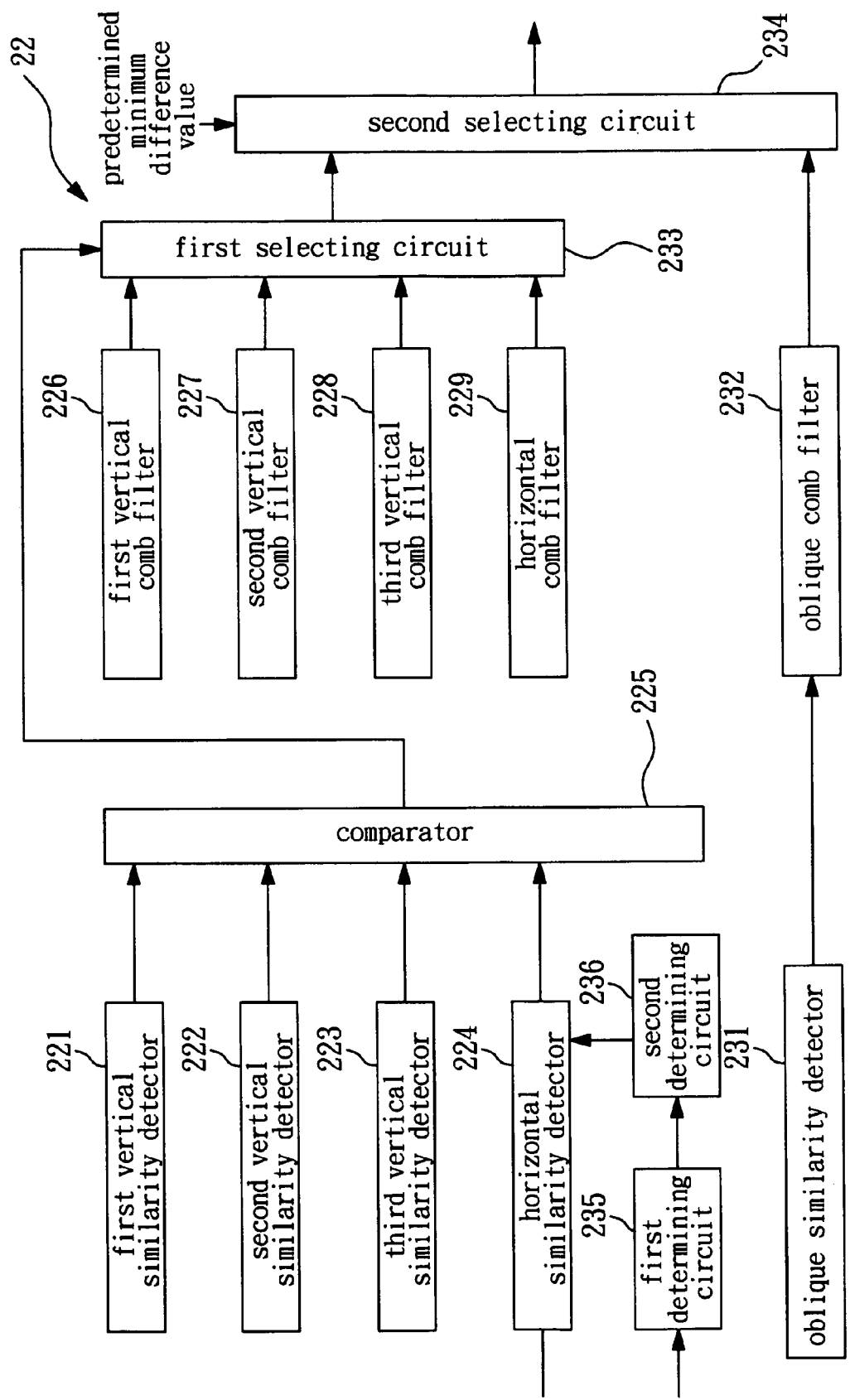
FIG. 6 is a schematic view of a 2D comb filter according to the present invention.

Referring to FIG. 6, the 2D comb filter 22 of the present invention is disclosed, which is not necessarily used in conjunction with the low-pass filter 21. Instead, the 2D comb filter 22 can be utilized independently to separate a composite signal (not limited to the high-frequency composite signal described above) into a luma signal and a chroma signal. The 2D comb filter 22 comprises a first vertical similarity detector 221, a second vertical similarity detector 222, a third vertical similarity detector 223, a horizontal similarity detector 224, a comparator 225, a first vertical comb filter 226, a second vertical comb filter 227, a third vertical comb filter 228, a horizontal comb filter 229, an oblique similarity detector 231, an oblique comb filter 232, a first selecting circuit 233, and a second selecting circuit 234.

The first vertical similarity detector 221, the second vertical similarity detector 222, and the third vertical similarity detector 223 form a vertical similarity detector set. The vertical similarity detector set is used for calculating the differences between the value of a predetermined point in a predetermined row and the values of corresponding points in a plurality of adjacent rows which are adjacent to the predetermined row, thereby obtaining a plurality of vertical difference values.

Figure 3:
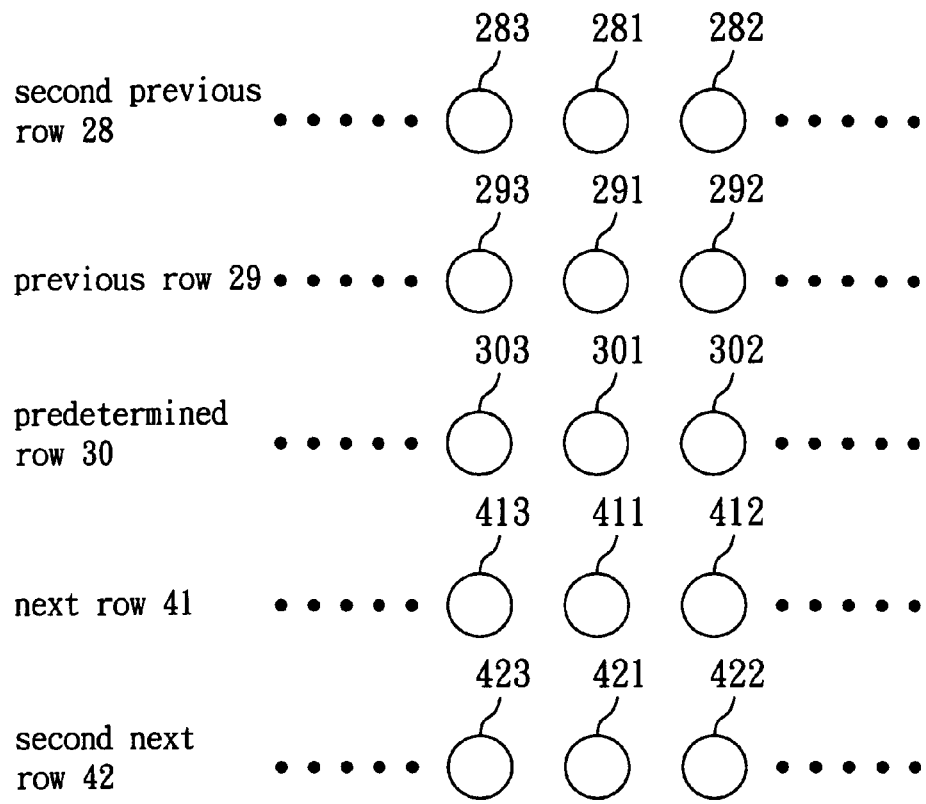
FIG. 3 is a schematic view of adjacent rows adjacent to a predetermined row of a predetermined point.

Meanwhile referring to FIG. 3, the operations of the first vertical similarity detector 221, the second vertical similarity detector 222, and the third vertical similarity detector 223 are illustrated. The first vertical similarity detector 221 is used for calculating the difference between the value $H_{301}$ of the predetermined point 301 in the predetermined row 30 and the value $H_{281}$ of a first corresponding point 281 in a second previous row 28 at an interval of two rows from the predetermined row 30, thereby obtaining a first vertical difference value. To obtain a more average value, the differences between the values $H_{302}$, $H_{303}$ of adjacent points 302, 303 adjacent to the predetermined point 301 and the values $H_{282}$, $H_{283}$ of adjacent points 282, 283 adjacent to the first corresponding point 281 can be incorporated into the calculation to obtain the first vertical difference value. Thus, the first vertical difference value DV1 can be represented as:

$$DV1=[(abs(H_{301}-H_{281}))\times 2+abs(H_{302}-H_{282})+abs(H_{303}-H_{283})]/4$$

wherein abs indicates obtaining the absolute value.

The second vertical similarity detector 222 is used for calculating the difference between the value $H_{301}$ of the predetermined point 301 in the predetermined row 30 and the value $H_{421}$ of a second corresponding point 421 in a second next row 42 at an interval of two rows from the predetermined row 30, thereby obtaining a second vertical difference value. To obtain a more average value, the differences between the values $H_{302}$, $H_{303}$ of the adjacent points 302, 303 adjacent to the predetermined point 301 and the values $H_{422}$, $H_{423}$ of adjacent points 422, 423 adjacent to the second corresponding point 421 can be incorporated into the calculation to obtain the second vertical difference value. Thus, the second vertical difference value DV2 can be represented as:

$$DV2=[(abs(H_{301}-H_{421}))\times 2+abs(H_{302}-H_{422})+abs(H_{303}-H_{423})]/4$$

The third vertical similarity detector 223 is used for calculating the difference between the value $H_{291}$ of a third corresponding point 291 in a previous row 29 at an interval of one row from the predetermined row 30 and the value $H_{411}$ of a fourth corresponding point 411 in a next row 41 at an interval of one row from the predetermined row 30, thereby obtaining a third vertical difference value. To obtain a more reasonable value, the differences between the values $H_{292}$, $H_{293}$ of adjacent points 292, 293 adjacent to the third corresponding point 291 and the values $H_{412}$, $H_{413}$ of adjacent points 412, 413 adjacent to the fourth corresponding point 411 can be incorporated into the calculation to obtain the third vertical difference value. Thus, the third vertical difference value DV3 can be represented as:

$$DV3=((abs(H_{291}-H_{411}))\times 2+abs(H_{292}-H_{412})+abs(H_{293}-H_{413}))/4.$$

Referring to FIG. 4, the operation of the horizontal similarity detector 224 is illustrated. The horizontal similarity detector 224 is used for calculating the differences between the value $H_{301}$ of the predetermined point 301 and the values $H_{302}$, $H_{303}$, $H_{304}$, $H_{305}$, $H_{306}$, $H_{307}$, $H_{308}$, $H_{309}$, $H_{310}$, $H_{311}$ of a plurality of adjacent points 302, 303, 304, 305, 306, 307, 308, 309, 310, 311 in the same row as the predetermined point 301, thereby obtaining a horizontal difference value. More particularly, the horizontal similarity detector 224 sequentially selects a pair of values from the value $H_{301}$ of the predetermined point 301 and the values of the adjacent points in the same row as the predetermined point 301 spaced at an interval of four points, calculates the differences between the pair of values, and selects a maximum value from the differences between the plural pairs of values, thus obtaining the horizontal difference value, which can be represented as:

$$DH=\max(abs(H_{311}-H_{303}), abs(H_{309}-H_{301}), abs(H_{307}-H_{302}), abs(H_{305}-H_{304}), abs(H_{303}-H_{306}), abs(H_{301}-H_{308}), abs(H_{302}-H_{310}))$$

wherein max indicates obtaining the maximum value.

The comparator 225 is used for determining the minimum of these vertical difference values (i.e., the first vertical difference value DV1, the second vertical difference value DV2, and the third vertical difference value DV3 described above) and the horizontal difference value DH, which acts as a minimum difference value.

The 2D comb filter 22 further comprises a first determining circuit 235 for determining whether the minimum difference value of the previous processed point preceding the predetermined point 301 is the horizontal difference value of the previous processed point. If so, the horizontal difference value calculated for the predetermined point 301 is divided by a predetermined parameter, for example, 4 to reduce the horizontal difference value calculated for the predetermined point 301 to ¼ of the original horizontal difference value, which is then inputted into the comparator 225 for comparison. The first determining circuit 235 aims at reducing the horizontal difference value in order to make it easier to be chosen as the minimum difference value.

As mentioned above, the horizontal similarity detector 224 selects two values spaced at an interval of four points to calculate the difference. To avoid any pattern being accidentally repeated at an interval of four columns, the 2D comb filter 22 further comprises a second determining circuit 236 for determining whether the value of the predetermined point 301 is the same as the values of a plurality of adjacent points in the same column as the predetermined point 301, and comparing the values of two columns spaced at an interval of four columns (for example, two columns in which points 301 and 309 are located), and if they are the same, the pattern is considered as being repeated at an interval of four columns. If this is the case, the horizontal difference value is not outputted.

Referring to FIG. 6 again, the first vertical comb filter 226, the second vertical comb filter 227, the third vertical comb filter 228, and the horizontal comb filter 229 are used for calculating a first vertical luma signal, a second vertical luma signal, a third vertical luma signal, and a horizontal luma signal respectively, which are inputted into the first selecting circuit 233. The first selecting circuit 233 is used for obtaining a corresponding luma signal from the vertical luma signals and the horizontal luma signal, based upon the minimum difference value calculated by the comparator 225. That is, if the minimum difference value is the horizontal difference value calculated by the horizontal similarity detector 224, the corresponding luma signal is the horizontal luma signal calculated by the horizontal comb filter 229; and if the minimum difference value is the first vertical difference value calculated by the first vertical similarity detector 221, the corresponding luma signal is the vertical luma signal calculated by the first vertical comb filter 226. The first selecting circuit 233 can be a multiplexer.

Thus, the first vertical comb filter 226, the second vertical comb filter 227, and the third vertical comb filter 228 may form a vertical comb filter set. The vertical comb filter set is used for calculating a plurality of vertical luma signals, based upon the value of the predetermined point in the predetermined row and the values of the corresponding points in the plurality of adjacent rows which are adjacent to the predetermined row, which will be described in detail below.

Again referring to FIG. 3, the operations of the first vertical comb filter 226, the second vertical comb filter 227, and the third vertical comb filter 228 are illustrated. The first vertical comb filter 226 is used for calculating the first vertical luma signal corresponding to the first vertical difference value DV1, based upon the value $H_{301}$ of the predetermined point 301 in the predetermined row 30 and the value $H_{291}$ of the third corresponding point 291 in the previous row 29. The first vertical luma signal YV1 can be represented as:

$$YV1=(H_{301}+H_{291})/2$$

The second vertical comb filter 227 is used for calculating the second vertical high-frequency luma signal YV2 corresponding to the second vertical difference value DV2, based upon the value $H_{301}$ of the predetermined point 301 in the predetermined row and the valuel $H_{411}$ of the fourth corresponding point 411 in the next row 41. The second vertical luma signal YV2 can be represented as:

$$YV2=(H_{301}+H_{411})/2$$

The third vertical comb filter 228 is used for calculating the third vertical high-frequency luma signal YV3 corresponding to the third vertical difference value DV3, based upon the value $H_{291}$ of the third corresponding point 291 in the previous row 29 and the value $H_{411}$ of the fourth corresponding point 411 in the next row 41. The third vertical luma signal YV3 can be represented as:

$$YV3=(H_{291}+H_{411})/2$$

Therefore, the vertical similarity detector set and the vertical comb filter set may form a vertical comb filter circuit. The vertical comb filter circuit is used for calculating the vertical difference values and the vertical luma signals.

Again referring to FIG. 4, the operation of the horizontal comb filter 229 is illustrated. The horizontal comb filter 229 is used for calculating the horizontal luma signal, based upon the value $H_{301}$ of the predetermined point 301 and the values $H_{305}$, $H_{304}$ of the plurality of adjacent points 305, 304 in the same row as the predetermined point 301. The horizontal luma signal YH1 can be represented as:

$$YH=(2H_{301}+H_{304}+H_{305})/4$$

Therefore, the horizontal similarity detector 224 and the horizontal comb filter 229 may form a horizontal comb filter circuit. The horizontal comb filter circuit is used for calculating the horizontal difference value and the horizontal luma signal.

After calculating the first vertical luma signal YV1, the second vertical luma signal YV2, the third vertical luma signal YV3, and the horizontal luma signal YH, the corresponding luma signal is then obtained from the vertical luma signals and the horizontal luma signal by the first selecting circuit 233, based upon the minimum difference value calculated by the comparator 225. The corresponding luma signal is inputted into the second selecting circuit 234. The second selecting circuit 234 functions based upon a predetermined minimum difference value. If the predetermined minimum difference value is greater than the minimum difference value, which indicates that the calculated minimum difference value satisfies the minimum standard, the corresponding luma signal can directly act as the luma signal. That is, the vertical comb filter or horizontal comb filter can be utilized to calculate the luma signal directly. On the contrary, if the predetermined minimum difference value is less than the minimum difference value, which indicates that the calculated minimum difference value doesn't satisfy the minimum standard, the vertical comb filter or horizontal comb filter can't be used for calculating the luma signal directly, and the oblique similarity detector 231 and the oblique comb filter 232 are further needed to be utilized to calculate the luma signal. The second selecting circuit 234 can be a multiplexer.

Figure 5:
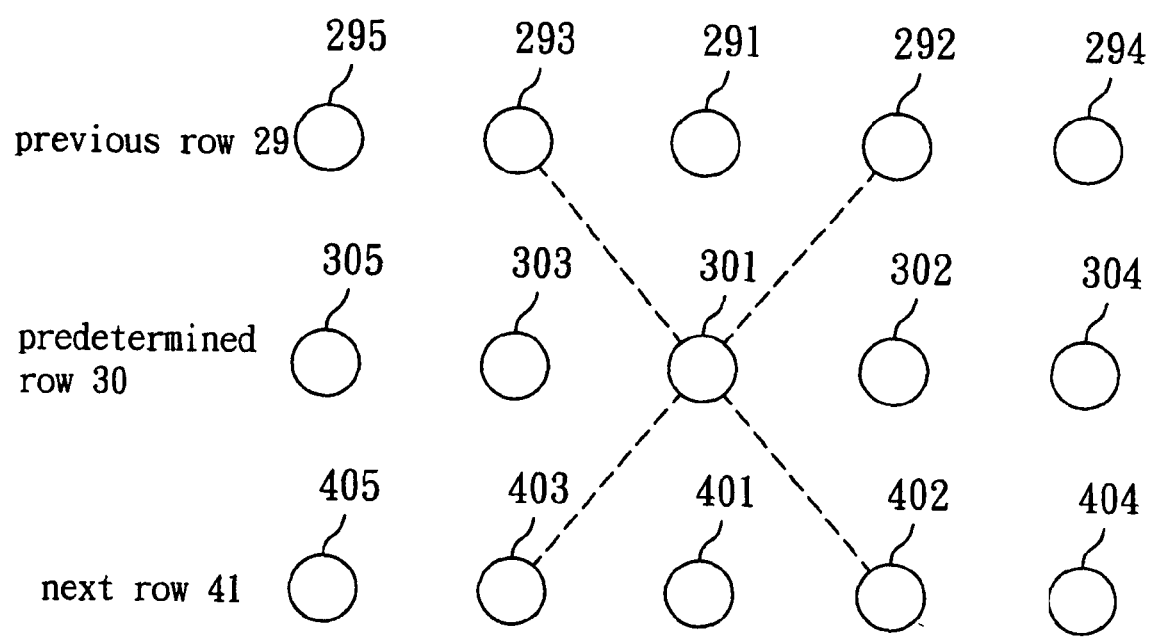
FIG. 5 is a schematic view of sampling points of an oblique similarity detector and an oblique comb filter.

Referring to FIG. 5, the operation of the oblique similarity detector 231 is illustrated. The oblique similarity detector 231 is used for calculating the differences between the value $H_{301}$ of the predetermined point 301 in the predetermined row 30 and the values $H_{292}$, $H_{293}$, $H_{402}$, $H_{403}$ of adjacent points 292, 293, 402, 403 in a plurality of adjacent rows 29 or 41 etc., adjacent to the predetermined row, wherein the adjacent points are oblique with respect to the predetermined point 301 being a centre, thereby obtaining a plurality of oblique difference values. As shown by dotted lines in FIG. 5, the first oblique difference value DS1 between the values in a first oblique direction (e.g., 45°) along the adjacent point 293, the predetermined point 301, and the adjacent point 402 is firstly obtained. The first oblique difference value DS1 can be represented as:

$$DS1=abs(H_{293}-H_{301})+abs(H_{301}-H_{402})$$

The second oblique difference value DS2 between the values in a second oblique direction (e.g., 135°) along the adjacent point 292, the predetermined point 301, and the adjacent point 403 is obtained. The second oblique difference value DS2 can be represented as:

$$DS2=abs(H_{292}-H_{301})+abs(H_{301}-H_{403})$$

Then, the first oblique difference value DS1 and the second oblique difference value DS2 are compared to obtain a smaller one.

The oblique comb filter 232 is used for calculating an oblique luma signal, based upon the value of the predetermined point in the predetermined row and the values of adjacent points in a plurality of adjacent rows adjacent to the predetermined row, and a minimum oblique difference value among the oblique difference values. As shown in the above embodiment, if the first oblique difference value DS1 is less than the second oblique difference value DS2, the first oblique difference value DS1 acts as the minimum oblique difference value. So, the oblique luma signal YS is calculated by obtaining the values of the adjacent point 293, the predetermined point 301, and the adjacent point 402 according to the first oblique direction. The oblique luma signal YS can be represented as:

$$YS=(H_{293}+2\times H_{301}+H_{402})$$

Therefore, the oblique similarity detector 231 and the oblique comb filter 232 may form an oblique comb filter circuit. The oblique comb filter circuit is used for calculating these oblique difference values and the oblique luma signal.

The oblique luma signal YS and the corresponding luma signal outputted by the first selecting circuit 233 are inputted into the second selecting circuit 234. The second selecting circuit 234 further receives the predetermined minimum difference value. If the predetermined minimum difference value is greater than the minimum difference value calculated by the comparator 225, which indicates that the calculated minimum difference value satisfies the minimum standard, the corresponding luma signal outputted by the first selecting circuit 233 can directly act as the luma signal. That is, the vertical comb filter or horizontal comb filter can be utilized to calculate the luma signal. On the contrary, if the predetermined minimum difference value is less than the minimum difference value, which indicates that the calculated minimum difference value doesn't satisfy the minimum standard, the vertical comb filter or horizontal comb filter can't be used for calculating the luma signal directly, and the oblique similarity detector 231 and the oblique comb filter 232 are further needed. The calculated oblique luma signal YS acts as the luma signal.

Therefore, the 2D comb filter 22 of the present invention utilizes a plurality of vertical similarity detectors 221, 222, 223 and the horizontal similarity detector 224 to detect the similarities in the vertical or horizontal direction of the predetermined point 301, and a minimum difference value is obtained. Based upon the minimum difference value, the luma signal is calculated by the corresponding comb filter, thus obtaining a better luma signal.

In addition, the 2D comb filter 22 of the present invention further utilizes the oblique similarity detector 231 to detect the similarities in a plurality of oblique directions of the predetermined point 301, and then an oblique luma signal is calculated by the oblique comb filter 232. That is, the 2D comb filter 22 of the present invention adds determination of the similarities in the oblique directions, therefore obtaining a better luma signal and chroma signal.

Figure 7:
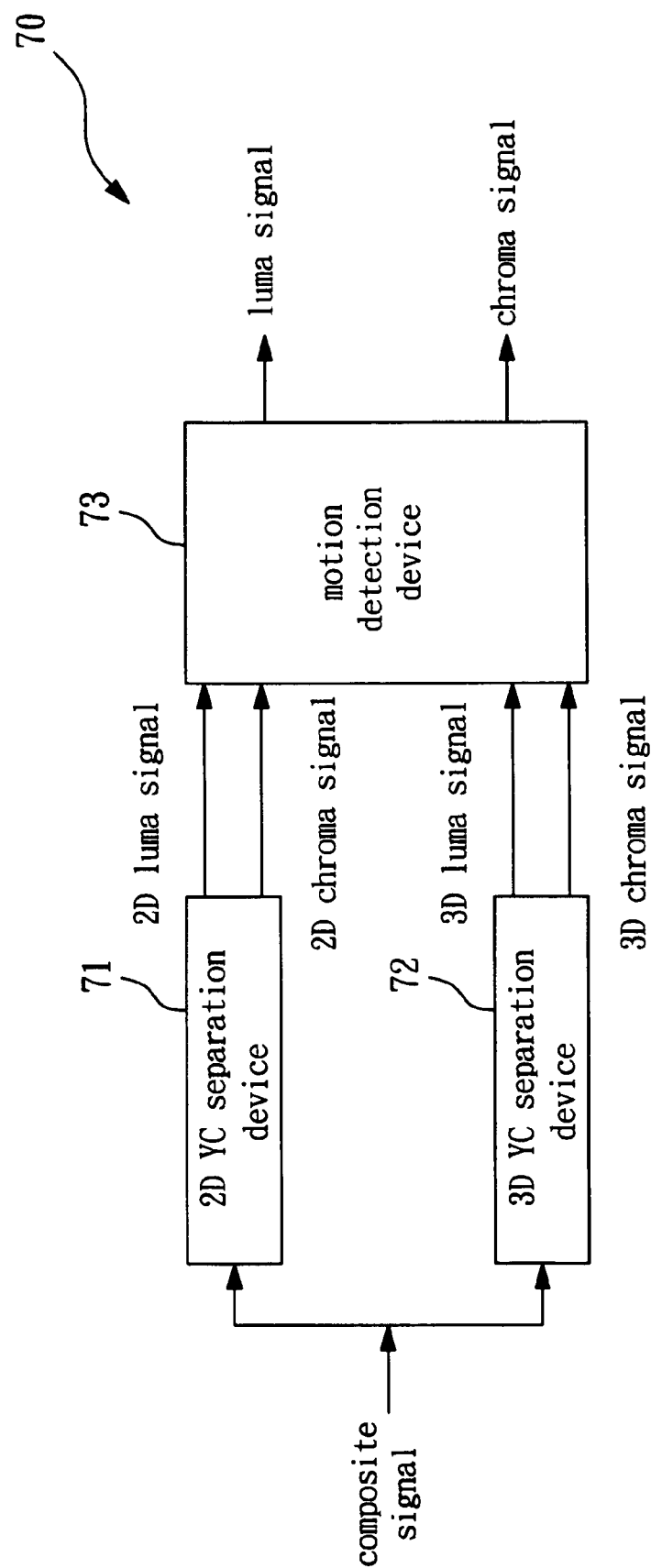
FIG. 7 is a schematic view of a YC separation system according to the present invention.

Referring to FIG. 7, it shows a schematic view of a YC separation system 70 of the present invention. The YC separation system 70 of the present invention is used to separate a composite signal into a luma signal and a chroma signal. The YC separation system 70 comprises a 2D YC separation device 71, a 3D YC separation device 72, and a motion detection device 73. The 2D YC separation device 71 is used to separate the composite signal into a 2D luma signal $Y_{2D}$ and a 2D chroma signal $C_{2D}$ based upon data of the same frame. The 2D YC separation device 71 is the 2D YC separation device 20 shown in FIG. 2 described above, which will not be illustrated herein.

The 3D YC separation device 72 is used to separate the composite signal into a 3D luma signal $Y_{3D}$ and a 3D chroma signal $C_{3D}$ based upon data of different frames. The 3D YC separation device 72 can employ the conventional technique as shown in FIG. 1, with the difference that the row delay circuit 11 in FIG. 1 is needs to be changed to a frame delay circuit, such that the composite signal can be separated into the 3D luma signal $Y_{3D}$ and the 3D chroma signal $C_{3D}$ based upon data of different frames.

The motion detection device 73 is used to detect whether the composite signals of the same predetermined point in different frames are the same, and thus determine a 2D parameter $P_{2D}$ and a 3D parameter $P_{3D}$, which are used in conjunction with the 2D luma signal $Y_{2D}$, the 2D chroma signal $C_{2D}$, the 3D luma signal $Y_{3D}$, and the 3D chroma signal $C_{3D}$ to calculate the luma signal Y and the chroma signal C. Therefore, the luma signal Y can be represented as:

$Y=(P_{2D} \times Y_{2D}+P_{3D} \times Y_{3D})/(P_{2D}+P_{3D})$

The chroma signal C can be represented as:

$C=(P_{2D} \times C_{2D}+P_{3D} \times C_{3D})/(P_{2D}+P_{3D})$

Therefore, the YC separation system 70 according to the present invention further utilizes the 3D YC separation device 72 and the motion detection device 73 besides the 2D YC separation device 71. That is, the determination and calculation of the composite data of different frames are added so as to obtain the precise luma signal and chroma signal.

While several embodiments of the present invention have been illustrated and described, various modifications and improvements can be made by those skilled in the art. The embodiment of the present invention is therefore described in an illustrative, but not restrictive, sense. It is intended that the present invention may not be limited to the particular forms as illustrated, and that all modifications which maintain the spirit and scope of the present invention are within the scope as defined in the appended claims

We claimed:

1. A YC separation device for separating a composite signal into a luma signal and a chroma signal, comprising:
   a low-pass filter, for separating the composite signal into a low-frequency composite signal and a high-frequency composite signal, the low-frequency composite signal being a low-frequency luma signal; and
   a comb filter, for separating the high-frequency composite signal into a high-frequency luma signal and the chroma signal, the luma signal comprising the low-frequency luma signal and the high-frequency luma signal,
   wherein the comb filter comprises:
   a vertical similarity detector set, for calculating differences between the value of a predetermined point in a predetermined row and the values of corresponding points in a plurality of adjacent rows which are adjacent to the predetermined row, thereby obtaining a plurality of vertical difference values;
   a horizontal similarity detector, for calculating the differences between the value of the predetermined point and the values of a plurality of adjacent points in the same row as the predetermined point, thereby obtaining a horizontal difference value;
   a vertical comb filter set, for calculating a plurality of vertical high-frequency luma signals, based upon the value of the predetermined point in the predetermined row and the values of corresponding points in a plurality of adjacent rows, which are adjacent to the predetermined row;
   a horizontal comb filter, for calculating a horizontal high-frequency luma signal, based upon the value of the predetermined point and the values of a plurality of adjacent points in the same row as the predetermined point;
   a comparator, for determining a minimum difference value, based upon the vertical difference values and the horizontal difference value, and thus obtaining a corresponding high frequency luma signal from the vertical high-frequency luma signals and the horizontal high-frequency luma signal based upon the minimum difference value;
   an oblique similarity detector, for calculating the differences between the value of the predetermined point in the predetermined row and the values of adjacent points in a plurality of adjacent rows which are adjacent to the predetermined row, wherein the adjacent points are oblique with respect to the predetermined point being a centre, thereby obtaining a plurality of oblique difference values; and
   an oblique comb filter, for calculating an oblique high-frequency luma signal, based upon the value of the predetermined point in the predetermined row and the values of adjacent points in a plurality of adjacent rows adjacent to the predetermined row, and a minimum oblique difference value among the oblique difference values; and one of the corresponding high-frequency luma signal and the oblique high-frequency luma signal selected as the high-frequency luma signal.

2. The YC separation device according to claim 1, wherein the low-pass filter calculates the low-frequency luma signal by processing a composite signal of a predetermined point, and composite signals of a plurality of adjacent points in the same row as the predetermined point based upon a weighting set.

3. The YC separation device according to claim 1, wherein the vertical similarity detector set comprises:
- a first vertical similarity detector, for calculating the difference between the value of the predetermined point in the predetermined row and the value of a first corresponding point in a second previous row at an interval of two rows from the predetermined row, thereby obtaining a first vertical difference value;
- a second vertical similarity detector, for calculating the difference between the value of the predetermined point in the predetermined row and the value of a second corresponding point in a second next row at an interval of two rows from the predetermined row, thereby obtaining a second vertical difference value;
- a third vertical similarity detector, for calculating the difference between the value of a third corresponding point in a previous row at an interval of one row from the predetermined row, and the value of a fourth corresponding point in a next row at an interval of one row from the predetermined row, thereby obtaining a third vertical difference value.

4. The YC separation device according to claim 3, wherein the vertical comb filter set comprises:
- a first vertical comb filter, for calculating a first vertical high-frequency luma signal corresponding to the first vertical difference value, based upon the value of the predetermined point in the predetermined row and the value of the third corresponding point in the previous row;
- a second vertical comb filter, for calculating a second vertical high-frequency luma signal corresponding to the second vertical difference value, based upon the value of the predetermined point in the predetermined row and the value of the fourth corresponding point in the next row;
- a third vertical comb filter, for calculating a third vertical high-frequency luma signal corresponding to the third vertical difference value, based upon the value of the third corresponding point in the previous row and the value of the fourth corresponding point in the next row.

5. The YC separation device according to claim 1, wherein the comb filter further comprises a first selecting circuit for obtaining the corresponding high-frequency luma signal from the vertical high-frequency luma signals and the horizontal high-frequency luma signal, based upon the minimum difference value.

6. The YC separation device according to claim 1, wherein the comb filter further comprises a second selecting circuit, which functions based upon a predetermined minimum difference value; if the predetermined minimum difference value is greater than the minimum difference value, the high-frequency luma signal is the corresponding high-frequency luma signal; and if the predetermined minimum difference value is less than the minimum difference value, the high-frequency luma signal is the oblique high-frequency luma signal.

7. The YC separation device according to claim 1, wherein the comb filter further comprises a first determining circuit for determining whether a minimum difference value of a previous processed point preceding the predetermined point is the horizontal difference value of the previous processed point; and if the minimum difference value of the previous processed point is its horizontal difference value, the horizontal difference value calculated from the predetermined point is divided by a predetermined parameter.

8. The YC separation device according to claim 1, wherein the horizontal similarity detector sequentially selects a pair of values from the value of the predetermined point and the values of the adjacent points in the same row as the predetermined point spaced at an interval of four points; and calculates the difference between the pair of values; and obtains a maximum value from the differences between the plural pairs of values, thus calculating the horizontal difference value.

9. The YC separation device according to claim 1, wherein the comb filter further comprises a second determining circuit for determining whether the value of the predetermined point is the same as the values of the adjacent points in the same column as the predetermined point; and comparing the values of two columns spaced at an interval of four columns; if they are the same, the horizontal difference value is not outputted.

10. A comb filter for separating a composite signal into a luma signal and a chroma signal, comprising:
- a vertical similarity detector set, for calculating the differences between the value of a predetermined point in a predetermined row and the values of corresponding points in a plurality of adjacent rows which are adjacent to the predetermined row, thereby obtaining a plurality of vertical difference values;
- a horizontal similarity detector, for calculating the differences between the value of the predetermined point and the values of a plurality of adjacent points in the same row as the predetermined point, thereby obtaining a horizontal difference value;
- a vertical comb filter set, for calculating a plurality of vertical luma signals, based upon the value of the predetermined point in the predetermined row and the values of corresponding points in a plurality of adjacent rows, which are adjacent to the predetermined row;
- a horizontal comb filter, for calculating a horizontal luma signal, based upon the value of the predetermined point and the values of a plurality of adjacent points in the same row as the predetermined point;
- a comparator, for determining a minimum difference value based upon the vertical difference values and the horizontal difference value, and thus obtaining a corresponding luma signal from the vertical luma signals and the horizontal luma signal based upon the minimum difference value;
- an oblique similarity detector, for calculating the differences between the value of the predetermined point in the predetermined row and the values of adjacent points in a plurality of adjacent rows which are adjacent to the predetermined row, wherein the adjacent points are oblique with respect to the predetermined point being a centre, thereby obtaining a plurality of oblique difference values; and
- an oblique comb filter, for calculating an oblique luma signal, based upon the value of the predetermined point in the predetermined row and the values of adjacent points in a plurality of adjacent rows adjacent to the predetermined row, and a minimum oblique difference value among the oblique difference values; and one of the corresponding luma signal and the oblique luma signal selected as the luma signal.

11. The comb filter according to claim 10, wherein the vertical similarity detector set comprises:
- a first vertical similarity detector, for calculating the difference between the value of the predetermined point in the predetermined row and the value of a first corresponding point in a second previous row at an interval of two rows from the predetermined row, thereby obtaining a first vertical difference value;

a second vertical similarity detector, for calculating the difference between the value of the predetermined point in the predetermined row and the value of a second corresponding point in a second next row at an interval of two rows from the predetermined row, thereby obtaining a second vertical difference value;

a third vertical similarity detector, for calculating the difference between the value of a third corresponding point in a previous row at an interval of one row from the predetermined row, and the value of a fourth corresponding point in a next row at an interval of one row from the predetermined row, thereby obtaining a third vertical difference value.

12. The comb filter according to claim 11, wherein the vertical comb filter set comprises:

a first vertical comb filter, for calculating a first vertical luma signal corresponding to the first vertical difference value, based upon the value of the predetermined point in the predetermined row and the value of the third corresponding point in the previous row;

a second vertical comb filter, for calculating a second vertical luma signal corresponding to the second vertical difference value, based upon the value of the predetermined point in the predetermined row and the value of the fourth corresponding point in the next row;

a third vertical comb filter, for calculating a third vertical luma signal corresponding to the third vertical difference value, based upon the value of the third corresponding point in the previous row and the value of the fourth corresponding point in the next row.

13. The comb filter according to claim 10, further comprising a first selecting circuit for obtaining the corresponding luma signal from the vertical luma signals and the horizontal luma signal, based upon the minimum difference value.

14. The comb filter according to claim 10, further comprising a second selecting circuit, which functions based upon a predetermined minimum difference value; if the predetermined minimum difference value is greater than the minimum difference value, the luma signal is the corresponding luma signal; and if the predetermined minimum difference value is less than the minimum difference value, the luma signal is the oblique luma signal.

15. The comb filter according to claim 10, further comprising a first determining circuit for determining whether a minimum difference value of a previous processed point of the predetermined point is the horizontal difference value of the previous processed point; and if the minimum difference value of the previous processed point is its horizontal difference value, the horizontal difference value calculated from the predetermined point is divided by a predetermined parameter.

16. The comb filter according to claim 10, wherein the horizontal similarity detector selects a pair of values from the composite signal of the predetermined point and the values of the adjacent points in the same row as the predetermined point spaced at an interval of four points; and calculates the difference between the pair of values; and obtains a maximum value from the differences between the plural pairs of values, thus calculating the horizontal difference value.

17. The comb filter according to claim 10, further comprising a second determining circuit for determining whether the value of the predetermined point is the same as the values of the adjacent points in the same column as the predetermined point; and comparing the values of two columns spaced at an interval of four columns; if they are the same, the horizontal difference value is not outputted.

18. A YC separation system for separating a composite signal into a luma signal and a chroma signal, comprising:

a 2D YC separation device, for separating the composite signal into a 2D luma signal and a 2D chroma signal based upon data of the same frame, the 2D YC separation device comprising a low-pass filter and a 2D comb filter, the low-pass filter for separating the composite signal into a low-frequency composite signal and a high-frequency composite signal, wherein the low-frequency composite signal is a low-frequency luma signal; and the 2D comb filter for separating the high-frequency composite signal into a high-frequency luma signal and the 2D chroma signal, wherein the 2D luma signal comprising the low-frequency luma signal and the high-frequency luma signal;

a 3D YC separation device, for separating the composite signal into a 3D luma signal and a 3D chroma signal based upon data of different frames; and a motion detection device, for detecting whether the composite signals of the same predetermined point in different frames are the same, and determining a 2D parameter and a 3D parameter, which are used in conjunction with the 2D luma signal, the 2D chroma signal, the 3D luma signal, and the 3D chroma signal to calculate the luma signal and the chroma signal.

19. The YC separation system according to claim 18, wherein the low-pass filter calculates the low-frequency luma signal by processing the value of a predetermined point and the values of a plurality of adjacent points in the same row as the predetermined point based upon a weighting set.

20. The YC separation system according to claim 18, wherein the 2D comb filter comprises:

a vertical similarity detector set, for calculating the differences between the value of a predetermined point in a predetermined row and the values of corresponding points in a plurality of adjacent rows which are adjacent to the predetermined row, thereby obtaining a plurality of vertical difference values;

a horizontal similarity detector, for calculating the differences between the value of the predetermined point and the values of a plurality of adjacent points in the same row as the predetermined point, thereby obtaining a horizontal difference value;

a vertical comb filter set, for calculating a plurality of vertical high-frequency luma signals, based upon the value of the predetermined point in the predetermined row and the values of corresponding points in a plurality of adjacent rows, which are adjacent to the predetermined row;

a horizontal comb filter, for calculating a horizontal high-frequency luma signal, based upon the value of the predetermined point and the values of a plurality of adjacent points in the same row as the predetermined point;

a comparator, for determining a minimum difference value, based upon the vertical difference values and the horizontal difference value, and thus obtaining a corresponding high-frequency luma signal from the vertical high-frequency luma signals and the horizontal high-frequency luma signal based upon the minimum difference value;

an oblique similarity detector, for calculating the differences between the value of the predetermined point in the predetermined row and the values of adjacent points in a plurality of adjacent rows which are adjacent to the predetermined row, wherein the adjacent points are oblique with respect to the predetermined point being a centre, thereby obtaining a plurality of oblique difference values; and an oblique comb filter, for calculating an oblique high-frequency luma signal, based upon the value of the predetermined point in the predetermined row and the values of adjacent points in a plurality of adjacent rows adjacent to the predetermined row, and a minimum oblique difference value among the oblique difference values; and one of the corresponding high-frequency luma signal and the oblique high-frequency luma signal selected as the high-frequency luma signal.

21. The YC separation system according to claim 20, wherein the vertical similarity detector set comprises:

a first vertical similarity detector, for calculating the difference between the value of the predetermined point in the predetermined row and the value of a first corresponding point in a second previous row at an interval of two rows from the predetermined row, thereby obtaining a first vertical difference value;

a second vertical similarity detector, for calculating the difference between the value of the predetermined point in the predetermined row and the value of a second corresponding point in a second next row at an interval of two rows from the predetermined row, thereby obtaining a second vertical difference value;

a third vertical similarity detector, for calculating the difference between the value of a third corresponding point in a previous row at an interval of one row from the predetermined row and the value of a fourth corresponding point in a next row at an interval of one row from the predetermined row, thereby obtaining a third vertical difference value.

22. The YC separation system according to claim 21, wherein the vertical comb filter set comprises:

a first vertical comb filter, for calculating a first vertical high-frequency luma signal corresponding to the first vertical difference value, based upon the value of the predetermined point in the predetermined row and the value of the third corresponding point in the previous row;

a second vertical comb filter, for calculating a second vertical high-frequency luma signal corresponding to the second vertical difference value, based upon the value of the predetermined point in the predetermined row and the value of the fourth corresponding point in the next row;

a third vertical comb filter, for calculating a third vertical high-frequency luma signal corresponding to the third vertical difference value, based upon the value of the third corresponding point in the previous row and the value of the fourth corresponding point in the next row.

23. The YC separation system according to claim 20, wherein the 2D comb filter further comprises a first selecting circuit for obtaining the corresponding high-frequency luma signal from the vertical high-frequency luma signals and the horizontal high-frequency luma signal, based upon the minimum difference value.

24. The YC separation system according to claim 20, wherein the 2D comb filter further comprises a second selecting circuit, which functions based upon a predetermined minimum difference value; if the predetermined minimum difference value is greater than the minimum difference value, the high-frequency luma signal is the corresponding high-frequency luma signal; and if the predetermined minimum difference value is less than the minimum difference value, the high frequency luma signal is the oblique high-frequency luma signal.

25. The YC separation system according to claim 20, wherein the 2D comb filter further comprises a first determining circuit for determining whether a minimum difference value of a previous processed point preceding the predetermined point is the horizontal difference value of the previous processed point; and if the minimum difference value of the previous processed point is its horizontal difference value, the horizontal difference value calculated from the predetermined point is divided by a predetermined parameter.

26. The YC separation system according to claim 20, wherein the horizontal similarity detector sequentially selects a pair of values from the value of the predetermined point and the values of the adjacent points in the same row as the predetermined point spaced at an interval of four points; and calculates the difference between the pair of values; and obtains a maximum value from the differences between the plural pairs of values, thus calculating the horizontal difference value.

27. The YC separation system according to claim 20, wherein the 2D comb filter further comprises a second determining circuit for determining whether the value of the predetermined point is the same as the values of the adjacent points in the same column as the predetermined point; and comparing the values of two columns spaced at an interval of four columns; if they are the same, the horizontal difference value is not outputted.

28. A comb filter for separating a composite signal into a luma signal and a chroma signal, comprising:

a vertical comb filter circuit, for calculating a vertical difference value based upon the value of a predetermined point;

a horizontal comb filter circuit, for calculating a horizontal difference value based upon the value of the predetermined point;

a first determining circuit, coupled to the horizontal comb filter circuit, for determining whether a calculated horizontal difference value acts as the horizontal difference value, wherein the calculated horizontal difference value is less than the horizontal difference value;

a comparator circuit, coupled to the vertical comb filter circuit and the horizontal comb filter circuit, for determining a minimum difference value of the predetermined point based upon the vertical difference value and the horizontal difference value; and a first selecting circuit coupled to the comparator circuit, for determining the luma signal based upon the minimum difference value.

29. The comb filter according to claim 28, wherein the first determining circuit is used for determining whether a minimum difference value of a previous processed point preceding the predetermined point is the horizontal difference value of the previous processed point; and if the minimum difference value of the previous processed point is its horizontal difference value, the horizontal difference value calculated from the predetermined point is divided by a predetermined parameter to be the calculated horizontal difference value.

30. The comb filter according to claim 28, further comprising a second determining circuit coupled to the horizontal comb filter circuit, for determining the values of two columns to determine the horizontal difference value.

31. The comb filter according to claim 30, wherein the second determining circuit is used for determining whether the value of the predetermined point is the same as the values of a plurality of adjacent points in the same column as the predetermined point; and comparing the values of two columns spaced at an interval of four columns; if they are the same, the horizontal difference value is not outputted.

32. The comb filter according to claim 28, further comprising a low-pass filter coupled to the vertical comb filter circuit and the horizontal comb filter circuit, for firstly filtering the composite signal into a low-frequency composite signal and a high-frequency composite signal, and the vertical comb filter circuit and the horizontal comb filter circuit used for processing the high-frequency composite signal.

33. The comb filter according to claim 28, further comprising:
an oblique comb filter circuit, for calculating an oblique luma signal based upon the value of the predetermined point; and
a second selecting circuit, coupled to the oblique comb filter circuit and the first selecting circuit, for determining the luma signal.

34. The comb filter according to claim 33, wherein the oblique comb filter circuit comprises an oblique similarity detector and an oblique comb filter, the oblique similarity detector for calculating an oblique difference value; and the oblique comb filter for calculating the oblique luma signal.

35. The comb filter according to claim 28, wherein the vertical comb filter circuit comprises at least one vertical similarity detector and at least one vertical comb filter, the vertical similarity detector for calculating the vertical difference value; the vertical comb filter for calculating a vertical luma signal.

36. The comb filter according to claim 28, wherein the horizontal comb filter circuit comprises a horizontal similarity detector and a horizontal comb filter, the horizontal similarity detector for calculating the horizontal difference value; the horizontal comb filter for calculating a horizontal luma signal.

37. A comb filter for separating a composite signal into a luma signal and a chroma signal, comprising:
a vertical comb filter circuit, for calculating a vertical difference value based upon the value of a predetermined point;
a horizontal comb filter circuit, for calculating a horizontal difference value based upon the value of the predetermined point;
an oblique comb filter circuit, for calculating an oblique difference value based upon the values of the predetermined point and an oblique predetermined point; and
a selecting circuit, coupled to the vertical comb filter circuit, the horizontal comb filter circuit, and the oblique comb filter circuit for determining the luma signal.

38. The comb filter according to claim 37, further comprising a first determining circuit coupled to the horizontal comb filter circuit, for determining whether a calculated horizontal difference value acts as the horizontal difference value, wherein the calculated horizontal difference value is less than the horizontal difference value.

39. The comb filter according to claim 38, wherein the first determining circuit is used for determining whether a minimum difference value of a previous processed point preceding the predetermined point is the horizontal difference value of the previous processed point; and if the minimum difference value of the previous processed point is its horizontal difference value, the horizontal difference value calculated from the predetermined point is divided by a predetermined parameter to be the calculated horizontal difference value.

40. The comb filter according to claim 37, further comprising a second determining circuit coupled to the horizontal comb filter circuit, for determining the values of two columns to determine the horizontal difference value.

41. The comb filter according to claim 40, wherein the second determining circuit is used for determining whether the value of the predetermined point is the same as the values of a plurality of adjacent points in the same column as the predetermined point; and comparing the values of two columns spaced at an interval of four columns; if they are the same, the horizontal difference value is not outputted.

42. The comb filter according to claim 37, further comprising a low-pass filter coupled to the vertical comb filter circuit and the horizontal comb filter circuit, for firstly filtering the composite signal into a low-frequency composite signal and a high-frequency composite signal, wherein the vertical comb filter circuit, the horizontal comb filter circuit, and the oblique comb filter circuit used for processing the high-frequency composite signal.

43. The comb filter according to claim 37, wherein the oblique comb filter circuit comprises an oblique similarity detector and an oblique comb filter, the oblique similarity detector for calculating the oblique difference value; the oblique comb filter for calculating an oblique luma signal.

44. The comb filter according to claim 37, wherein the vertical comb filter circuit comprises at least one vertical similarity detector and at least one vertical comb filter, the vertical similarity detector for calculating the vertical difference value; the vertical comb filter for calculating a vertical luma signal.

45. The comb filter according to claim 37, wherein the horizontal comb filter circuit comprises a horizontal similarity detector and a horizontal comb filter, the horizontal similarity detector for calculating the horizontal difference value; the horizontal comb filter for calculating a horizontal luma signal.

46. A comb filtering method for separating a composite signal into a luma signal and a chroma signal, comprising the steps of:
(a) calculating a vertical difference value based upon the value of a predetermined point;
(b) calculating a horizontal difference value based upon the value of the predetermined point;
(c) determining whether a calculated horizontal difference value acts as the horizontal difference value, wherein the calculated horizontal difference value is less than the horizontal difference value; and
(d) determining the luma signal based upon the vertical difference value and the horizontal difference value.

47. The comb filtering method according to claim 46, in the step (c) determining whether a minimum difference value of a previous processed point preceding the predetermined point is the horizontal difference value of the previous processed point; and if the minimum difference value of the previous processed point is its horizontal difference value, the horizontal difference value calculated from the predetermined point is divided by a predetermined parameter to be the calculated horizontal difference value.

48. The comb filtering method according to claim 46, wherein after the step (c), further comprising a determining step of determining the values of two columns, and if they are the same, the horizontal difference value is not outputted.

49. The comb filtering method according to claim 48, wherein the determining step is used for determining whether the value of the predetermined point is the same as the values of a plurality of adjacent points in the same column as the predetermined point; and comparing the values of two columns spaced at an interval of four columns, and if they are the same, the horizontal difference value is not outputted.

50. The comb filtering method according to claim 46, wherein before the step (a), further comprising a step of firstly low-pass filtering the composite signal into a low-frequency composite signal and a high-frequency composite signal.

51. The comb filtering method according to claim 46, wherein the step (d) further comprises the following steps:
   (d1) calculating an oblique luma signal based upon the value of the predetermined point; and
   (d2) determining the luma signal based upon a predetermined minimum difference value, the vertical difference value, and the horizontal difference value.

52. A comb filtering method for separating a composite signal into a luma signal and a chroma signal, comprising the steps of:
   (a) calculating a vertical difference value based upon the value of a predetermined point; and
   (b) calculating a horizontal difference value based upon the value of the predetermined point;
   (c) calculating an oblique difference value based upon the values of the predetermined point and an oblique predetermined point; and
   (d) determining the luma signal based upon the vertical difference value, the horizontal difference value, and the oblique difference value.

53. The comb filtering method according to claim 52, wherein the step (b) further comprises a first determining step of determining whether a calculated horizontal difference value acts as the horizontal difference value, wherein the calculated horizontal difference value is less than the horizontal difference value.

54. The comb filtering method according to claim 53, wherein the first determining step is used for determining whether a minimum difference value of a previous processed point preceding the predetermined point is the horizontal difference value of the previous processed point; and if the minimum difference value of the previous processed point is its horizontal difference value, the horizontal difference value calculated from the predetermined point is divided by a predetermined parameter to be the calculated horizontal difference value.

55. The comb filtering method according to claim 52, wherein the step (b) further comprises a second determining step of determining the values of two columns, and if they are the same, the horizontal difference value is not outputted.

56. The comb filtering method according to claim 55, wherein the second determining step is used for determining whether the value of the predetermined point is the same as the values of a plurality of adjacent points in the same column as the predetermined point; and comparing the values of two columns spaced at an interval of four columns, and if they are the same, the horizontal difference value is not outputted.

57. The comb filtering method according to claim 52, wherein before the step (a), further comprising a step of firstly low-pass filtering the composite signal into a low-frequency composite signal and a high-frequency composite signal.

58. A comb filtering method for separating a composite signal into a luma signal and a chroma signal, comprising the steps of:
   (a) low-pass filtering the composite signal into a low-frequency composite signal and a high-frequency composite signal, wherein the low-frequency composite signal is a low-frequency luma signal; and
   (b) separating the high-frequency composite signal into a high frequency luma signal and the chroma signal, wherein the luma signal comprises the low-frequency luma signal and the high-frequency luma signal,
   wherein the step (b) further comprises the following steps:
      (b1) calculating a vertical difference value based upon the high-frequency value of a predetermined point;
      (b2) calculating a horizontal difference value based upon the high-frequency value of the predetermined point;
      (b3) calculating an oblique difference value based upon the high-frequency values of the predetermined point and an oblique predetermined point; and
      (b4) determining the high-frequency luma signal based upon the vertical difference value, the horizontal difference value, and the oblique difference value.

59. The comb filtering method according to claim 58, wherein in the step (a), the low frequency luma signal is calculated by processing the value of a predetermined point and the values of a plurality of adjacent points in the same row as the predetermined point based upon a weighting set.

60. The comb filtering method according to claim 58, wherein the step (b2) further comprises a first determining step of determining whether a calculated horizontal difference value acts as the horizontal difference value, wherein the calculated horizontal difference value is less than the horizontal difference value.

61. The comb filtering method according to claim 60, wherein the first determining step is used for determining whether a minimum difference value of a previous processed point preceding the predetermined point is the horizontal difference value of the previous processed point; and if the minimum difference value of the previous processed point is its horizontal difference value, the horizontal difference value calculated from the predetermined point is divided by a predetermined parameter to yield the calculated horizontal difference value.

62. The comb filtering method according to claim 58, wherein the step (b2) further comprises a second determining step of determining the high-frequency values of two columns, and if they are the same, the horizontal difference value is not outputted.

63. The comb filtering method according to claim 62, wherein the second determining step is used for determining whether the high-frequency value of the predetermined point is the same as the high-frequency values of a plurality of adjacent points in the same column as the predetermined point; and comparing the high-frequency values of two columns spaced at an interval of four columns, and if they are the same, the horizontal difference value is not outputted.

64. A comb filtering method for separating a composite signal into a luma signal and a chroma signal, comprising the steps of:
   (a) low-pass filtering the composite signal into a low-frequency composite signal and a high-frequency composite signal, wherein the low-frequency composite signal is a low-frequency luma signal; and
   (b) separating the high-frequency composite signal into a high frequency luma signal and the chroma signal, wherein the luma signal comprises the low-frequency luma signal and the high-frequency luma signal,
   wherein the step (b) further comprises the following steps:
      (b1) calculating a vertical difference value based upon the high-frequency value of a predetermined point;
      (b2) calculating a horizontal difference value based upon the high-frequency value of the predetermined point;
      (b3) determining whether a calculated horizontal difference value acts as the horizontal difference value, wherein the calculated horizontal difference value is less than the horizontal difference value; and (b4) determining the high-frequency luma signal based upon the vertical difference value and the horizontal difference value.

65. The comb filtering method according to claim 64, in the step (b3) determining whether a minimum difference value of a previous processed point preceding the predetermined point is the horizontal difference value of the previous processed point; and if the minimum difference value of the previous processed point is its horizontal difference value, the horizontal difference value calculated from the predetermined point is divided by a predetermined parameter to be the calculated horizontal difference value.

66. The comb filtering method according to claim 64, wherein after the step (b3), further comprising a determining step of determining the high-frequency values of two columns, and if they are the same, the horizontal difference value is not outputted.

67. The comb filtering method according to claim 66, wherein the determining step is used for determining whether the high-frequency value of the predetermined point is the same as the high-frequency values of a plurality of adjacent points in the same column as the predetermined point; and comparing the high frequency values of two columns spaced at an interval of four columns, and if they are the same, the horizontal difference value is not outputted.

68. The comb filtering method according to claim 64, wherein the step (b4) further comprises the following steps:
 (b41) calculating an oblique luma signal based upon the high-frequency value of the predetermined point;
 (b42) determining the high-frequency luma signal based upon a predetermined minimum difference value, the vertical difference value, and the horizontal difference value.

69. A YC separation system for separating a composite signal into a luma signal and a chroma signal, comprising:
 a 2D comb filter comprising:
 a vertical comb filter circuit, for calculating a vertical difference value based upon the value of a predetermined point;
 a horizontal comb filter circuit, for calculating a horizontal difference value based upon the value of the predetermined point;
 a first determining circuit coupled to the horizontal comb filter circuit, for determining whether a calculated horizontal difference value acts as the horizontal difference value, wherein the calculated horizontal difference value is less than the horizontal difference value; and
 a selecting circuit, for determining a 2D luma signal based upon the vertical difference value and the horizontal difference value;
 a 3D comb filter, for determining a 3D luma signal based upon composite signals of different frames; and
 a motion detection device, coupled to the 2D comb filter and the 3D comb filter, for calculating the luma signal based upon a 2D parameter, the 2D luma signal, and the 3D luma signal.

70. A YC separation system for separating a composite signal into a luma signal and a chroma signal, comprising:
 a 2D comb filter comprising:
 a vertical comb filter circuit, for calculating a vertical difference value based upon the value of a predetermined point;
 a horizontal comb filter circuit, for calculating a horizontal difference value based upon the value of the predetermined point;
 an oblique comb filter circuit, for calculating an oblique difference value based upon the values of the predetermined point and an oblique predetermined point; and
 a selecting circuit, coupled to the vertical filter circuit, the horizontal filter circuit, and the oblique filter circuit for determining a 2D luma signal;
 a 3D comb filter, for determining a 3D luma signal based upon composite signals of different frames; and
 a motion detection device, coupled to the 2D comb filter and the 3D comb filter, for calculating the luma signal based upon a 2D parameter, the 2D luma signal, and the 3D luma signal.

* * * * *